UNITED STATES PATENT OFFICE.

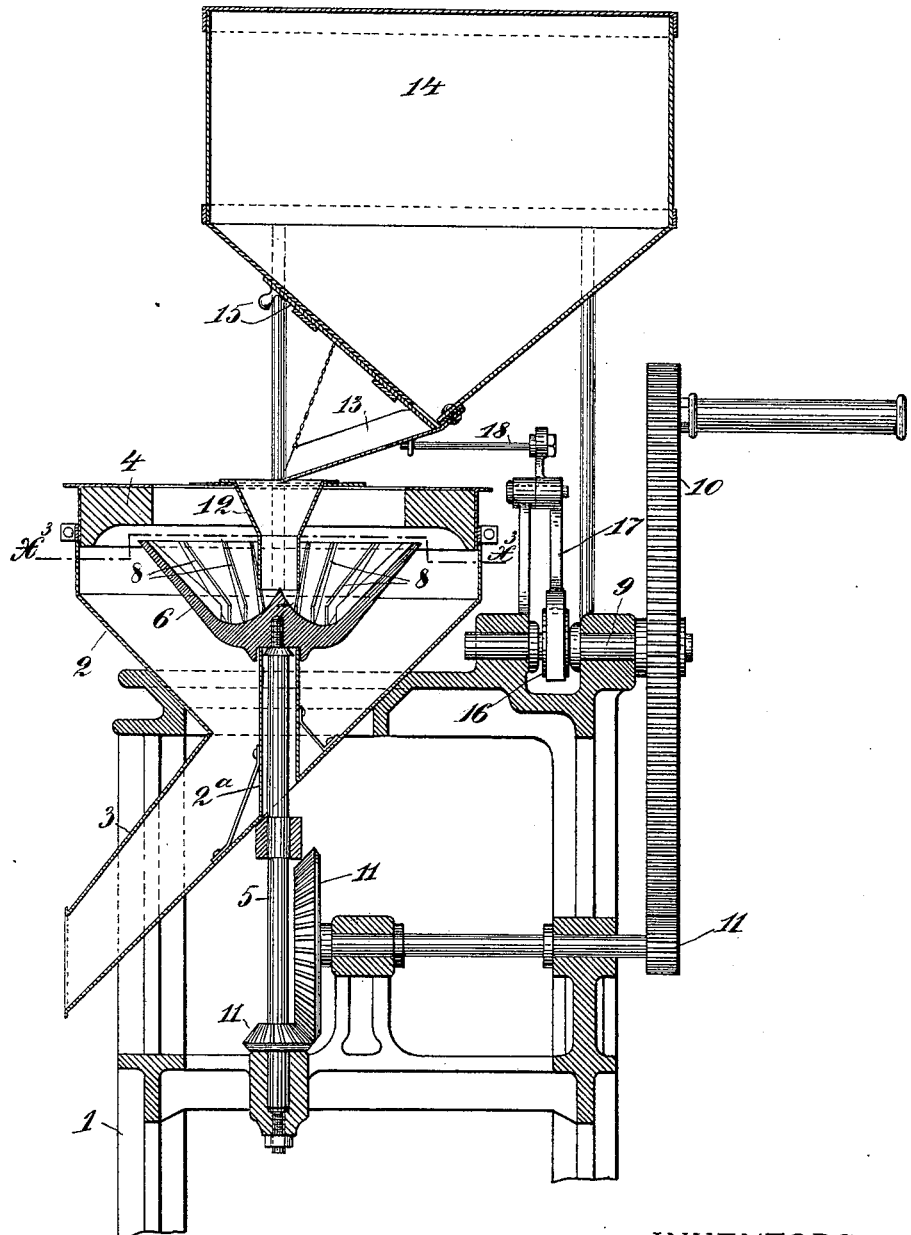

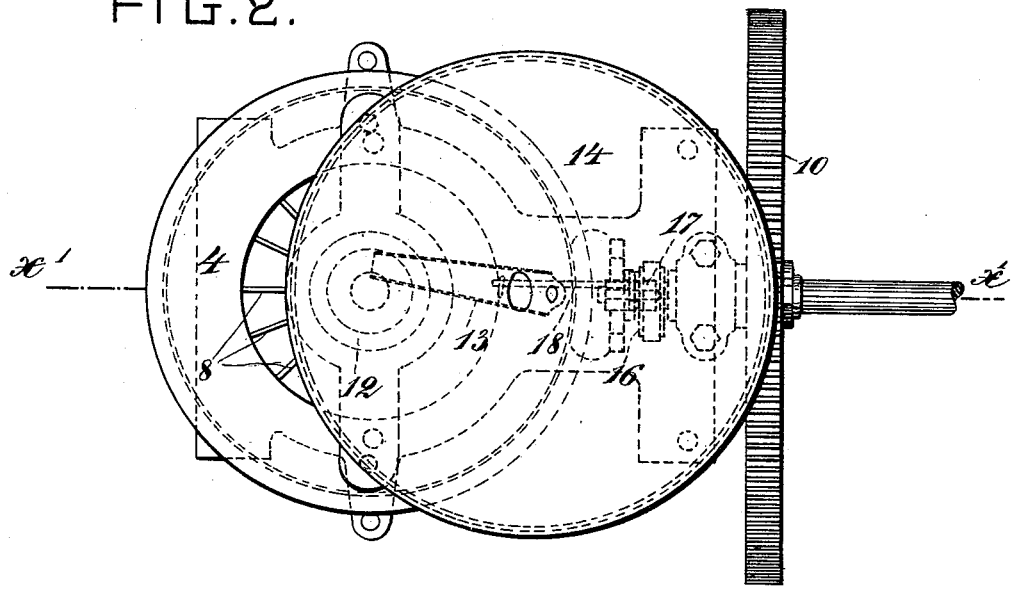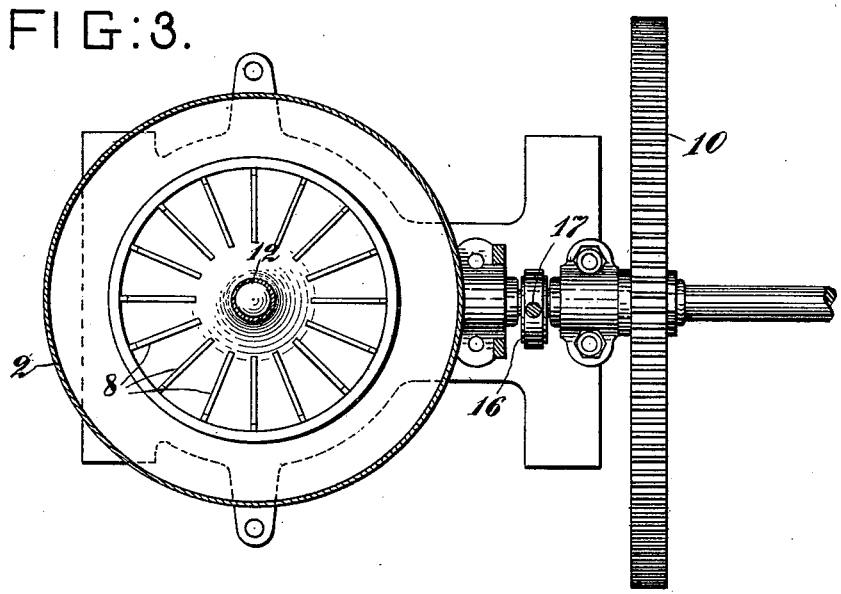

NILS HJALMER NILSSON AND EMIL TEODOR THERMÆNIUS, OF SVALOF, SWEDEN.

MACHINE FOR TREATING SEEDS.

SPECIFICATION forming part of Letters Patent No. 582,873, dated May 18, 1897.

Application filed February 18, 1896. Serial No. 579,735. (No model.)

*To all whom it may concern:*

Be it known that we, NILS HJALMER NILSSON and EMIL TEODOR THERMÆNIUS, subjects of the King of Sweden and Norway, and residents of Svalof, in the Kingdom of Sweden, have invented certain new and useful Improvements in Machines for Treating Seeds, of which the following is a specification.

It is a fact long known that the seeds of certain pulses—as, for instance, those of the clovers and most of the wild species of the genera *Vicia, Lathyrus, Medicago,* &c.—offer great resistance to the penetration of moisture from without, this penetration being the first condition for commencing germination. This property diminishes to a great extent the cultivating value of such seeds, and even makes the use of certain species, the properties of which are otherwise very promising, impossible in a regular culture.

It has been found that the obstacle to the entrance of the water in the above-mentioned seeds depends exclusively upon an extraordinarily hard cortical formation, or, rather, cuticularization of the extremely thin surface layer of the outer walls of the epidermoid cells; and the object of the present invention is to provide a machine which shall be especially adapted for treating such seeds for the purpose of aiding their germination. The treatment consists in removing a part of the thin outer surface layer of the seed-hull, and the machine effects this by grinding or abrasion in such a manner as to slightly thin the hull of the seed without in any way damaging the vital part of the seed within the hull. By this means there is imparted to the hard seeds of pulse, &c., the same power and energy of germination that exists in other plant-seeds, and the difficulties now incident to the propagation of wild pulses by seeding are removed. At the same time it is possible by our invention to give to the clover-seeds a greater cultivating value than they have hitherto had for the reasons given above.

The accompanying drawings illustrate an embodiment of our machine.

In the drawings, Figure 1 is a vertical axial section of the machine in the plane indicated by line $x'$ in Fig. 2. Fig. 2 is a plan of the same. Fig. 3 is a horizontal section of the same in the plane indicated by the line $x^3$ in Fig. 1.

In a suitable frame 1 is fixed a receiving chamber or hopper 2, having an outlet or discharge spout 3; and on the top of this hopper is mounted an abrading plate or ring 4, having a concave under surface, as seen in Fig. 1. In the frame is also mounted an upright shaft 5, which projects upwardly into the receiving-hopper 2 and carries on its upper end a bowl 6. This bowl has a central cone 7 and radial ribs 8, and its upper margin takes under the abrading-ring 4, as clearly shown.

The purpose of the central cone 7 is to divide the descending stream of seeds and deflect the latter outward toward the wall of the hopper, where they will come more fully within the influence of the centrifugal force.

The shaft 5 may be driven by any suitable gearing. As here shown it is driven from a crank-shaft 9 through the medium of a crank-wheel 10 on said shaft and intermediate gear-wheels 11.

Mounted over the center of the bowl 6 and pendent therein is a tube or funnel 12, which receives the seed to be treated from the shaking spout 13 of a feed-hopper 14, which may be mounted on the frame.

The operation is as follows: The bowl 6 is rapidly rotated and the seed from the hopper 14 admitted gradually thereto, the regulation of the feed being effected in the ordinary manner by a slide 15 on the bottom of the hopper 14. The seeds flowing down through the funnel 12 fall on the cone in the axis of the bowl 6 and are caused thereby and by the centrifugal force to spread outward and up along the flaring sides of the bowl, the ribs thereon compelling the seeds to rotate with the bowl. As the seeds pass over the rim or upper margin of the bowl they are thrown outwardly and upwardly against the concave under surface of the abrading plate or ring 4. They are thrown with such force and velocity against the abrading-surface that they are carried over the said surface and ground or abraded to a sufficient extent. At the outer edge of the concave surface of the ring 4 the seeds fall into the incasing hopper or receiver 2 and flow thence out at the discharge-spout 3.

The energy with which the seeds impinge on the abrading-surface of the ring 4 is dependent on the velocity with which they leave the bowl, and this may be regulated by varying the rotative speed of the bowl. Thus by regulating the rotative speed of the bowl the machine may be adapted to the various kinds of seeds to be treated, these latter varying in weight and also in the hardness of their hulls.

It is common to use skaking spouts for feed-hoppers of mills and the like, and any means may be employed for shaking or jarring the spout 13 if such shaking or jarring be deemed necessary. In the present case we have shown an eccentric 16 on the crank-shaft 9, arranged to rotate in a fork on the lower end of a lever 17, fulcrumed on a bracket on the frame 1, said lever having at its upper end a pin 18, which engages a keeper on the hinged spout 13.

Where the shaft 5 passes up into the hopper 2 it is incased in a tube 2ª on the hopper.

The abrading plate or ring 4 may be made of some hard gritty material, as gritstone, emery, &c., or have an abrading-surface formed of such material; or it may be of hard metal with a suitably-roughened or file surface. A surface formed of the same material as the well-known emery-wheels will serve very well. This part 4 has been called herein a "ring" merely because it must have an aperture at the center to admit the grain to the bowl and because only the ring-like outer part comes into play when the seeds are thrown from the rim of the bowl.

Having thus described our invention, we claim—

The combination with a frame, a receiving-chamber mounted therein, a rotating vertical shaft in the frame and projecting upwardly into said chamber, a bowl 6, mounted on the upper end of said shaft and provided with a central cone and radial ribs, a plate or ring 4, having a concave abrading-surface, arranged over the upper rim of said bowl and adjacent thereto, and the tube, 12, for supplying seeds to the center of the bowl, substantially as set forth.

In witness whereof we have hereunto signed our names in the presence of two subscribing witnesses.

NILS HJALMER NILSSON.
EMIL TEODOR THERMÆNIUS.

Witnesses:
BROR. FLENSBURG,
GEO. ELSTEAND.